United States Patent Office 3,704,243
Patented Nov. 28, 1972

3,704,243
N-(SUBSTITUTED SULFONYLMETHYL)-2-PYRROLIDINONES
Harlan B. Freyermuth and David I. Randall, Easton, Pa., assignors to GAF Corporation, New York, N.Y.
No Drawing. Filed Mar. 30, 1970, Ser. No. 24,028
Int. Cl. C07d 27/08
U.S. Cl. 260—326.5 SF          7 Claims

ABSTRACT OF THE DISCLOSURE

Sulfonylmethyl derivatives of N-methyl-2-pyrrolidinone of the structural formula:

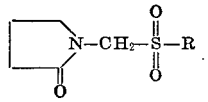

wherein R represents a hydrocarbon group such as alkyl, aryl, cycloalkyl, aralkyl or alkaryl, are useful as dyestuff intermediates. They are prepared by the reaction of N-hydroxymethyl-2-pyrrolidinone with an appropriate sulfinic acid.

BACKGROUND OF THE INVENTION

Field of the invention

This invention relates to N-(substituted sulfonylmethyl) derivatives of N-hydroxymethyl-2-pyrrolidinone and methods for their production.

Description of the prior art

N-hydroxymethyl pyrrolidinone is a compound known in the art as an intermediate in the preparation of dyestuffs. As taught in U.S. Pat. No. 3,073,843, this material is prepared by the reaction of pyrrolidinone and formaldehyde or a precursor of formaldehyde. This patent does not suggest the formation of other derivatives of this compound however. In addition, Chemical Abstracts, volume 55, p. 27267h (1961) discloses the reaction of N-chloromethyl-2-pyrrolidinone with a mixture of sodium methylate and methanol to yield 64% of N-methoxymethyl-2-pyrrolidinone. Also, Chemical Abstracts, volume 54, p. 1286f (1960) teaches that N-chloromethyl-2-pyrrolidinone can be prepared in 87% yield by treatment of the methylol derivative with $SOCl_2$ in benzene solvent at 8° C.

In none of these prior art teachings, however, are there suggestions for preparation of N-sulfonylmethyl derivatives of N-hydroxymethyl pyrrolidinone which are useful as dyestuff intermediates.

SUMMARY OF THE INVENTION

It is accordingly one object of the invention to provide N-sulfonylmethyl derivatives of N-hydroxymethyl-2-pyrrolidinone.

A further object of the invention is to provide N-(sulfonylmethyl)-2-pyrrolidinones useful as dyestuff intermediates.

Other objects and advantages of the present invention will become apparent as the description thereof proceeds.

In satisfaction of the foregoing objects and advantages there are provided by this invention N-(sulfonylmethyl) derivatives of N-hydroxymethyl-2-pyrrolidinones which have the following structural formula:

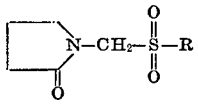

wherein R is a hydrocarbon group or substituted hydrocarbon group, and methods for their production.

DESCRIPTION OF PREFERRED EMBODIMENTS

As indicated above, this invention is concerned with N-(sulfonylmethyl) derivatives of N - hydroxymethyl-2-pyrrolidinone which are useful as dyestuff intermediates and in biological applications. They are particularly useful as dyestuff intermediates for the preparation of dyes particularly for synthetic fibers such as polyesters, polyamides, polyacrylonitriles and the like.

As indicated, these novel products have the following general structural formula:

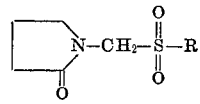

wherein R is a hydrocarbon or substituted hydrocarbon group. Representative hydrocarbon groups for R include the following:

(a) Alkyl groups and substituted alkyl groups of 1 to about 18 carbon atoms, either straight or branched chained, e.g. methyl, ethyl, n-propyl, isopropyl, n-butyl, isobutyl, n-pentyl, n-hexyl, nonyl, decyl, dodecyl, hydroxymethyl, 2-hydroxyethyl, 3-hydroxypropyl, haloalkyl, e.g. chloromethyl, chloroethyl, etc. and the like;

(b) Cycloalkyl groups of 3 to about 8 carbon atoms such as cyclopropyl, cyclobutyl, cyclopentyl, cyclohexyl, cycloheptyl and cyclooctyl;

(c) Aryl and alkaryl groups of about 6 to about 15 carbon atoms wherein any alkyl substituent can contain up to about 7 carbon atoms, e.g. phenyl, o-, m- and p-xylyl, tolyl, phenyl substituted by one or more alkyl groups, 1-naphthyl, 2-naphthyl, and the like; and (d) Aralkyl groups such as benzyl, phenethyl and the like having about 6 to 15 carbon atoms.

As indicated above, the products of the invention are useful dyestuff intermediates. Thus in these compounds, when R is phenyl or other aryl group, it can be readily nitrated and the nitro group reduced to the amine, both reactions being conducted by conventional methods. The amino group can then be diazotized and coupled with various couplers by methods known in the dye art to produce azo-dyestuffs. Alternatively, the amino group can be condensed with bromomine acid and similar compounds to produce dyestuffs directly. These processes are well known and are described in U.S. Pat. 3,100,131 for example. Furthermore, when R in these compounds is hydroxyethyl, the sulfones can be used to animalize cotton and other cellulose fibers by treatment with an aqueous dispersion of the compound, also as described in U.S. Pat. 3,100,131.

It is also to be appreciated that when R is a long chain alkyl group (or alkylbenzene group), i.e. contains at least 8 carbon atoms or more, the products have interesting properties as surfactants, the long chain group being an hydrophobic group and the lactam group being an hydrophilic group so that the products would have the proper hydrophobic-hydrophilic balance to be useful as surface active agents. Accordingly, the products of this invention have many and varied uses.

The compounds of this invention are prepared by the reaction of N-hydroxymethyl-2-pyrrolidinone (obtained as described in U.S. Pat. 3,073,843), with a sulfinic acid or salt thereof having the following formula:

$RSO_2M$ wherein R is as described above and M is hydrogen or a metal, preferably an alkali metal, e.g. sodium, potassium or lithium. The sulfinic acid or salt is generally utilized as an aqueous solution of about 10–50% strength by weight, the water present also serving as a convenient medium in which to conduct the reaction.

The reaction is also preferably conducted in the presence of about 1 to 10% of an acid catalyst for best results. The acid catalyst may be either a mineral acid, an organic acid or mixture thereof. In many cases, it is necessary to add an additional amount of catalyst in order to complete the reaction. Suitable acid catalysts which may be used include mineral acids such as hydrochloric acid, sulfuric acid, phosphoric acid, phosphonic acid, nitric acid and the like. Organic acid catalysts which may be used include acetic acid, para-toluenesulfonic acid, benzenesulfonic acid, methanesulfonic acid, trichloroacetic acid and the like.

The reaction is conducted by charging the sulfinic acid reactant and catalyst to a reactor, preferably with gradual addition of the catalyst, and thereafter adding the N-hydroxymethyl pyrrolidinone to the mixture at a temperature of about 20° to 50° C., preferably room temperature. After agitation at room temperature for several hours, the mixture is then heated at about 80°–110° C., or at the reflux point, for a short period while adding a sufficient quantity of water (about an equal volume) to effect complete solution. Thereafter, the mixture is cooled, the excess base neutralized by the gradual addition of an aqueous solution (10–60%) of an alkali metal or alkaline earth metal hydroxide, and the resulting precipitated product removed as by filtration. Yields from this reaction will run about 70–90% of theory.

The following examples are provided to illustrate the products and process of the invention but it is not to be considered as limited thereto.

EXAMPLE I

In a one liter three necked flask equipped with a stirrer, thermometer and condenser was placed 328 grams (295 ml.) of a 25% aqueous solution of sodium benzenesulfinate (containing 82 grams 100% or 0.5 mole of pure material). Through a dropping funnel was added 42 ml. (50 grams) of concentrated hydrochloric acid (sp. g. 1.192) in about 15–20 minutes, during which time the free benzenesulfinic acid precipitated out as a thick white slurry. To this mixture was added 58 grams (0.5 mole) N-hydroxymethyl-2-pyrrolidinone at room temperature. An additional 21 ml. (25 grams) (sp. g. 1.192) of concentrated hydrochloric acid was added and the mixture was allowed to stir overnight at room temperature. The mixture was then heated to reflux and water was added portionwise (approximately 500 ml.) until a complete solution resulted. The mixture was cooled to room temperature and the excess hydrochloric acid neutralized by a dropwise addition of 34 grams (21 ml.) of a 50% sodium hydroxide solution to a pH of 10.2. The white precipitated sulfone derivative was filtered in a Buchner funnel, the cake washed neutral with about 150 ml. distilled water and the product dried in a vacuum oven at 60° C. The product weighed 93 grams and this represented a yield of 77.5% of theory. The N-(2-pyrrolidinonylmethyl)-phenylsulfone melted at 143–5° C. and IR, NMR and analysis for nitrogen and sulfur indicates the assigned structure:

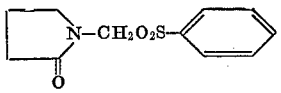

Calculated for $C_{11}H_{13}NSO_3$ (percent): N, 5.87; S, 13.40.
Found (percent): N, 6.09; S, 13.20.

EXAMPLE II

The reaction of Example I was repeated except that the sulfinic acid reaction used was 0.5 mole of sodium methane sulfinate and the catalyst was p-toluenesulfonic acid. Utilizing the same reaction conditions and work-up procedure, there was obtained a good yield of N-(2-pyrrolidinonylmethyl) methyl sulfone.

EXAMPLE III

The reaction of Example I was repeated except that the sulfinic acid reactant was 0.5 mole of potassium octadecylsulfinate and the catalyst was phosphoric acid. Using the same reaction conditions there was obtained a good yield (71%) of N-(2-pyrrolidinonylmethyl) octadecyl sulfone.

The invention has been described herein with reference to certain preferred embodiments. However, the invention is not to be considered as limited thereto as variations thereon will become obvious to those skilled in the art.

What is claimed is:

1. A compound of the following structure:

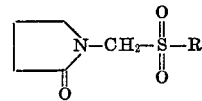

wherein R is selected from the group consisting of alkyl of 1 to 12 carbon atoms, either straight or branched chained, which alkyl group may be further substituted by hydroxyl or halogen, cycloalkyl of 3 to 8 carbon atoms, phenyl, phenyl substituted by one or two methyl groups, naphthyl, benzyl, and phenethyl.

2. A compound according to claim 1 wherein R is selected from the group consisting of methyl, ethyl, n-propyl, isopropyl, n-butyl, isobutyl, n-pentyl, n-hexyl, nonyl, decyl, dodecyl, hydroxymethyl, 2-hydroxyethyl, 3-hydroxypropyl, chloromethyl, chloroethyl, cyclopropyl, cyclobutyl, cyclopentyl, cyclohexyl, cycloheptyl, cyclooctyl, phenyl, tolyl, o-, m- and p-xylyl, 1-naphthyl, 2-naphthyl, benzyl and phenethyl.

3. A compound according to claim 1 wherein R is methyl.

4. A compound according to claim 1 wherein R is phenyl.

5. A compound according to claim 1 wherein R is p-tolyl.

6. A compound according to claim 1 wherein R is octadecyl.

7. A compound according to claim 1 wherein R is ethyl.

References Cited

UNITED STATES PATENTS 3,188,317  6/1965  Hickner _____ 260—307

OTHER REFERENCES

Wragg et al., J. Chem. Soc. (London), 1958, pp. 3603–05.

ALEX MAZEL, Primary Examiner

J. A. NARCAVAGE, Assistant Examiner

U.S. Cl. X.R.

8—1; 252—542